(12) United States Patent
Charles et al.

(10) Patent No.: US 8,028,000 B2
(45) Date of Patent: Sep. 27, 2011

(54) DATA STORAGE STRUCTURE

(75) Inventors: Denis X. Charles, Bellevue, WA (US); Kumar H. Chellapilla, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 569 days.

(21) Appl. No.: 12/038,813

(22) Filed: Feb. 28, 2008

(65) Prior Publication Data

US 2009/0222408 A1 Sep. 3, 2009

(51) Int. Cl.
*G06F 17/30* (2006.01)
*G06F 7/00* (2006.01)

(52) U.S. Cl. ........................................ 707/802; 707/741
(58) Field of Classification Search .................. 707/741, 707/802, 999.3
See application file for complete search history.

(56) References Cited

U.S. PATENT DOCUMENTS

| | | | |
|---|---|---|---|
| 5,701,464 A | 12/1997 | Aucsmith | |
| 6,182,066 B1 * | 1/2001 | Marques | 1/1 |
| 6,236,991 B1 * | 5/2001 | Frauenhofer et al. | 707/709 |
| 6,542,888 B2 * | 4/2003 | Marques | 1/1 |
| 6,920,477 B2 | 7/2005 | Mitzenmacher | |
| 7,065,619 B1 | 6/2006 | Zhu et al. | |
| 7,080,091 B2 * | 7/2006 | Matsuda | 1/1 |
| 7,426,520 B2 * | 9/2008 | Gorelik et al. | 1/1 |
| 2001/0013047 A1 * | 8/2001 | Marques | 707/536 |
| 2003/0225779 A1 * | 12/2003 | Matsuda | 707/102 |
| 2003/0229627 A1 * | 12/2003 | Carlson et al. | 707/3 |
| 2005/0055369 A1 * | 3/2005 | Gorelik et al. | 707/102 |
| 2005/0283567 A1 * | 12/2005 | Popescu-Stanesti et al. | 711/106 |
| 2006/0116990 A1 | 6/2006 | Margolus et al. | |
| 2007/0078827 A1 | 4/2007 | Sareen et al. | |
| 2007/0136331 A1 | 6/2007 | Hasan et al. | |
| 2007/0260594 A1 * | 11/2007 | Lewak et al. | 707/4 |
| 2007/0260602 A1 | 11/2007 | Taylor | |
| 2008/0091691 A1 * | 4/2008 | Tsuji | 707/100 |
| 2009/0063538 A1 * | 3/2009 | Chitrapura et al. | 707/102 |
| 2009/0094274 A1 * | 4/2009 | Gorelik et al. | 707/102 |

OTHER PUBLICATIONS

Huebsch, Ryan, et al., "The Architecture of PIER: An Internet-Scale Query Processor", CIDR 2005, 2nd Biennial Conf. on Innovative Data Systems Research, Jan. 2005, pp. 28-43.*
Bhattacharjee, Bobby, et al., "Efficient Peer-To-Peer Searches Using Result-Caching", IPTPS 2003, LNCS 2735, Spring-Verlag, Berlin, Germany, © 2003, pp. 225-236.*
Jain, Navendu, et al., "Using Bloom Filters to Refine Web Search Results (extended version)", WebDB 2005, Baltimore, MD, © 2005, 9 pages.*
Ilyas, Ihab F., et al., "CORDS: Automatic Discovery of Correlations and Soft Functional Dependencies", SIGMOD, Paris, France, Jun. 13-18, 2004, 12 pages.*
Putze., et al, "Cache-, Hash- and Space-Efficient Bloom Filters", pp. 1-14, 2008.
Laufer., et al., "Generalized Bloom Filters", pp. 1-13, 2008.

(Continued)

*Primary Examiner* — Robert Stevens

(57) ABSTRACT

Efficient data storage and retrieval (e.g., in terms of time and space requirements) is facilitated by implementing an indexing structure comprising an indexing array. That is, a functional relationship between elements of a source set and elements of a query result set can be stored in the indexing structure. This allows, for example, a query regarding whether an element is a member of a set (e.g., whether a particular website or Uniform Resource Locator (URL)) has been visited before) as well as a relationship between the member set and the query (e.g., the number of hyperlinks in the website the last time it was visited) to be resolved efficiently.

20 Claims, 12 Drawing Sheets

| Elements x of Source Set | Position in array $h_1(x)$ | Position in array $h_2(x)$ | Value of $h_3(x)$ | Query Result r |
|---|---|---|---|---|
| 37 | g0 | g1 | 8 | 12 |
| 41 | g2 | g1 | 20 | 13 |
| 43 | g1 | g3 | 19 | 14 |
| 47 | g6 | g7 | 27 | 15 |
| 53 | g7 | g9 | 3 | 16 |
| 59 | g7 | g11 | 0 | 17 |
| 61 | g12 | g14 | 11 | 18 |
| 67 | g14 | g15 | 15 | 19 |

90 — 92, 94, 94, 96, 98

OTHER PUBLICATIONS

Chazelle., et al., "The Bloomier Filter: An Efficient Data Structure for Static Support Lookup Tables", supported in part by NSF grant CCR-998817, hARO Grant DAAH04-96-1-0181, and NEC Laboratories America. pp. 1-10, 2008.

Song., et al., "Fast Hash Table Lookup Using Extended Bloom Filter: An Aid to Network Processing", SIGCOMM'05, Aug. 21-26, 2005, Philadelphia, Pennsylvania, USA. pp. 1-12, 2008.

Bruck., et al., "Weighted Bloom Filter", pp. 1-5, 2008.

Botelho., et al., "An Approach for Minimal Perfect Hash Functions for Very Large Databases", pp. 1-8, 2008.

Botelho., et al., "Simple and Space-Efficient Minimal Perfect Hash Functions" supported in part by GERINDO Project—grant MCT/CNPq/CT- INFO 552.087/02.5, and CNPq Grants 30.5237/02-0 (Nivio Ziviani) and 142786/2006-3 (Fabiano C. Botelho). pp. 1-13, 2008.

F. C. Botelho, Y. Kohayakawa, and N. Ziviani. A Practical Minimal Perfect Hashing Method. 4th Intl. Workshop on Efficient and Experimental Algorithms (WEA05), Springer-Verlag, vol. 3505, 488-500, 2005.

Z. Czech, G. Havas, and B. Majewski. An optimal algorithm for generating minimal perfect hash functions. Information Processing Letters, 43(5):257-264, 1992.

* cited by examiner

| Elements x of Source Set | Position in array $h_1(x)$ | Position in array $h_2(x)$ | Value of $h_3(x)$ | Query Result r |
|---|---|---|---|---|
| 37 | g0 | g1 | 8 | 12 |
| 41 | g2 | g1 | 20 | 13 |
| 43 | g1 | g3 | 19 | 14 |
| 47 | g6 | g7 | 27 | 15 |
| 53 | g7 | g9 | 3 | 16 |
| 59 | g7 | g11 | 0 | 17 |
| 61 | g12 | g14 | 11 | 18 |
| 67 | g14 | g15 | 15 | 19 |

130 ⟶

| 132 ARRAY POSITION/ GRAPH VERTICES | 134 VARIABLE/VALUE STORED IN ARRAY |
|---|---|
| 0 | 0 |
| 1 | 4 |
| 2 | -11 |
| 3 | -9 |
| 4 | 0 |
| 5 | 0 |
| 6 | -3 |
| 7 | 0 |
| 8 | 0 |
| 9 | 13 |
| 10 | 0 |
| 11 | 17 |
| 12 | 0 |
| 13 | 0 |
| 14 | 7 |
| 15 | -4 |
| 16 | 0 |
| 17 | 0 |

FIG. 9

DATA STORAGE STRUCTURE

BACKGROUND

In computing environments, data storage and retrieval take many forms and utilize varied methods. Utility, space-efficiency, and speed are common goals for those creating and using data structures. Data storage can involve vast computer warehouses storing large volumes of varied information, banks storing account information, or business databases collecting information related to operating their business. While these types of systems are common, there are many situations that require quick responses to specific questions using a small amount of storage resources.

SUMMARY

This Summary is provided to introduce a selection of concepts in a simplified form that are further described below in the Detailed Description.

In a computing environment, when one wants to find out whether a particular item is a member of a set, a Bloom Filter can be used to store and retrieve this information. For example, an online library could use a Bloom filter to determine whether a requested book is in the set of books that happen to be carried by the library and made available to the public. However, if one wants to determine, not only membership within a set, but also another characteristic about an item, a Bloom Filter is insufficient, so traditional database systems are used. For example, if one wanted to determine whether a particular person was a registered voter in the State of Ohio, a Bloom Filter could handle this information. However, if they also wanted to know in what zip code the voter resided, a traditional database system would typically be needed.

As provided herein an indexed storage structure or indexing structure is designed to quickly and efficiently retrieve queried information. Furthermore, this indexing structure is designed to be created more quickly and in a more compact manner than its predecessors, needing a bit array merely twice the size of the number of elements in the membership set. For example, this indexing structure could quickly and efficiently store the residential zip code information for all registered voters in Ohio, and when queried return whether an individual was a registered voter and in which zip code they reside.

Two hash functions are implemented to map variables to an indexing array to create the indexing structure. The variables are created by an algorithm that utilizes linear algebra to back solve for unknown variables from those that are known, such as the zip code information, which is known at creation of the indexing structure. Furthermore, an acyclic graphical representation of the indexing array is presumed by choosing an array size larger than twice the number of elements in the membership set. This acyclic graph gives us another variable in the algorithm, as the primary variable can be set to zero at the initiation of the algorithm for respective sets of vertices in an acyclic graphical tree. Additionally, a parity hash function is used in the algorithm to allow us to later determine the elements' membership.

Once the array is populated, querying the array is accomplished by again using the two hash functions. The variables stored in the array at the positions identified by the hash functions are entered into the query algorithm, which is the same one used at creation of the indexing structure, and then combined with the parity hash function. The output will be the answer to the query, which will also indicate whether the item is a member of the set, or an indication that the item is not a member of the set.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 9 is a table illustrating exemplary variables stored at respective positions in an indexing array corresponding to vertices on a graphical representation.

DETAILED DESCRIPTION

Figure 1:
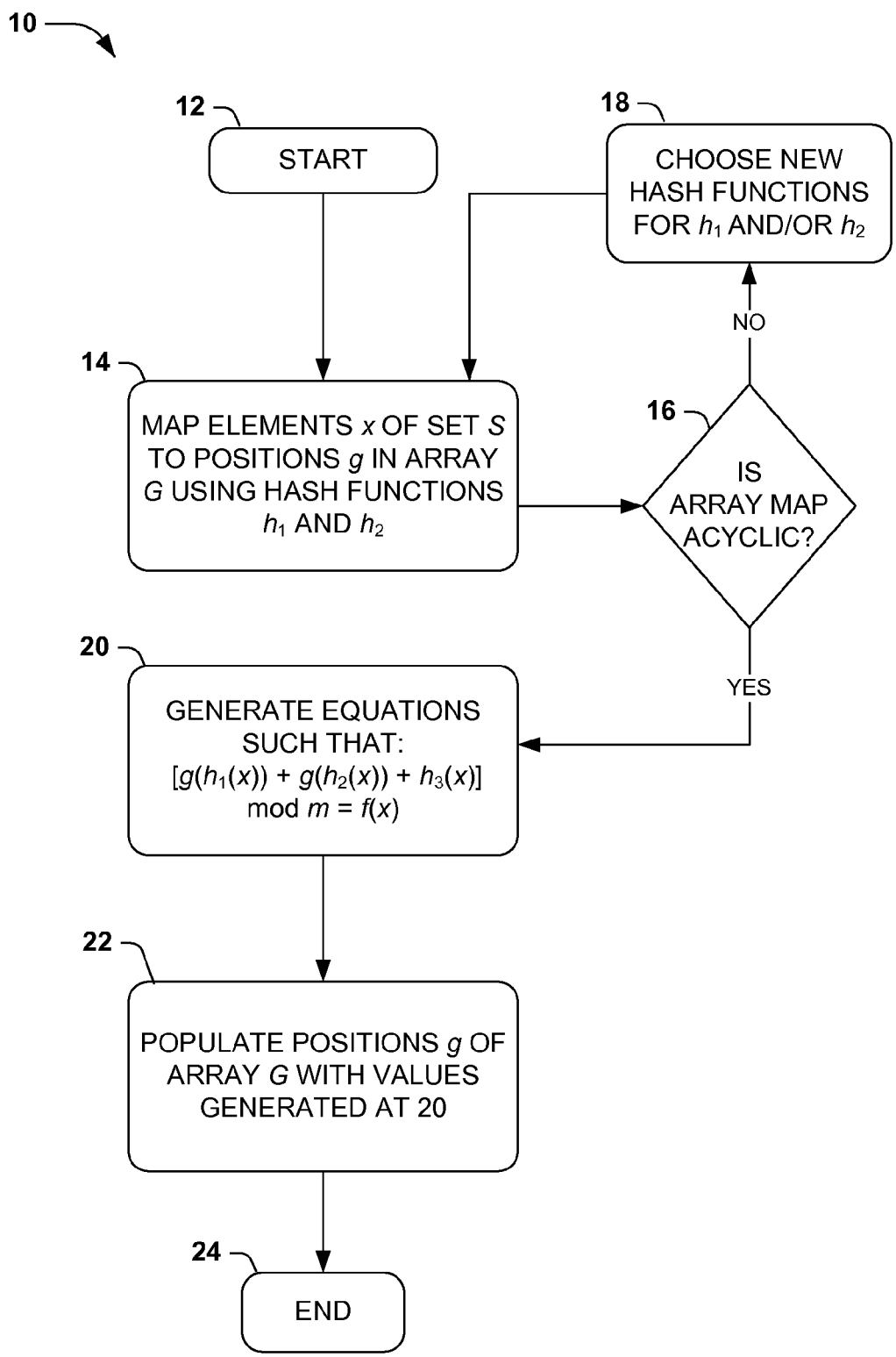
FIG. 1 is a flow diagram illustrating an exemplary method of creating an indexing structure.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

In a computing environment, to determine whether a particular item is a member of a set one can, among other things, create a traditional database and perform a string match search against the database, or create and query a Bloom Filter. If one wanted to determine whether a particular item was a member of a certain set of elements they could perform a string search, comparing the queried item against respective elements stored in the database, or they could create a Bloom Filter and query to get a "yes" or "no" concerning membership. Each of these has its limitations, however. For example, the database string search takes a very long time compared with the Bloom Filter, and the database itself takes up a lot of memory resources compared with the Bloom Filter. However, the Bloom Filter has the possibility of returning "false positives". That is, it may return a "yes" to a query (e.g., yes the queried item is an element of this set) when in fact the answer should have been "no." Further, querying for membership is the only query one can perform against a Bloom Filter. Also, once created, the elements of a Bloom Filter cannot be changed or deleted without recreating the entire Bloom Filter.

Often, in computing, a database search will not only involve a membership query, but some other relationship between the member set and the query as well. As one example, a system that manages URL data generated by a web crawler may need to be able to determine whether URLs gathered by the crawler have been previously visited. Further, one factor in deciding whether the crawler needs to revisit a particular URL may be a change in the number of links to other URLs found in a particular URL (or any one of many other particular features of a URL). Therefore, the URL management system needs to know how many links are currently listed for that particular URL in the database to compare with the newly generated data. Not only does the system have to perform a membership query for each URL, but also query the relationship "how many URL links are in this URL." The system will have to determine membership and retrieve the number of linked URLs by checking against the historical database. A system that manages URL data generated by a web crawler may contain millions or even billions of retrieved URLs. Storing the URLs and checking against the stored data using a string search lookup could be very resource intensive and time consuming, increasing with each added URL and each particular feature queried. While Bloom Filters have very compact storage capabilities, and the lookup time is constant regardless of the size, they can only be used to query membership (e.g., whether the URL has been previously visited), not a second function (e.g., the number of links in the URL, or some other feature).

Figures 6, 7:
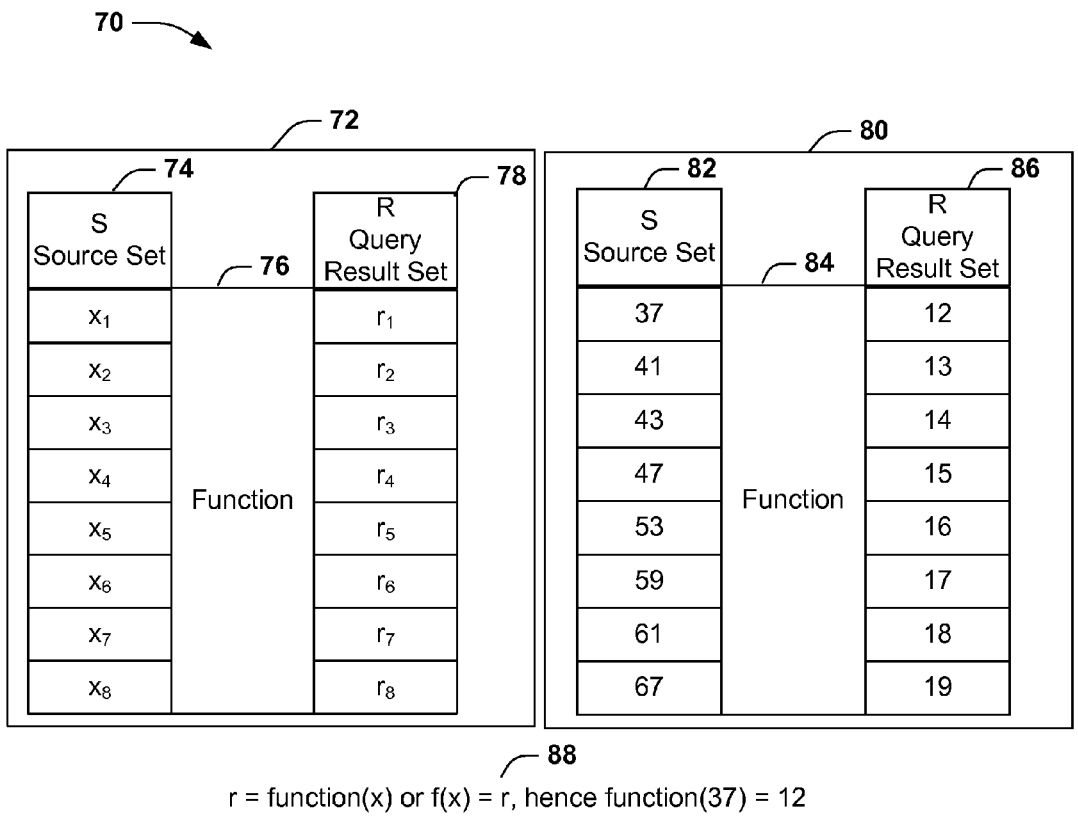
FIG. 6 is an illustration of exemplary functional relationships between a source set and a query set.
FIG. 7 is a table illustrating an exemplary relationship between elements of a source set, vertices in an indexing array, and values of a parity hash function.

One technique for storing a function (relationship) between a source set and a query is creating a particular indexing structure, a generalization of a Bloom Filter, often referred to as a Bloomier Filter. This technique is devised to encode a function into a data structure. This encoded data structure allows one to resolve a query against the data structure to determine membership in a set along with a relationship between the source set and the queried item. Therefore, as illustrated in FIG. 6, a data structure 72 can be devised to store the function $f: S \rightarrow R$ 76 that supports queries to the function value, resulting in either an output $r \in R$ 78 (the result of the query, which also means the queried item $x \in S$ 74), or "⊥" (a symbol representing that the queried item $x \notin S$ 74).

Similarly, in the example illustrated in FIG. 6, data structure 80 may store the function 84: the index 86 of the $12^{th}$ through the $19^{th}$ prime numbers 82, such that a number queried to the data structure 80 would return an output of either the index value 86 (if the queried number was one of the $12^{th}$ through the $19^{th}$ prime numbers 82) or "⊥" (if the queried number was not one of the $12^{th}$ through the $19^{th}$ prime numbers 82).

FIG. 1 illustrates an exemplary method 10 devised to create a data structure, with the ability to store a function, that is simpler to construct than previous techniques and reduces the time of creation of the data structure, over previous techniques, from O(n Log n) to O(n), where n is the number of elements in the source set. The exemplary method 10 begins at 12 and maps positions g for each $x \in S$ to an index array G, using 2 hash functions $h_1$ and $h_2$ at 14. At 16, a determination is made as to whether the mapped positions in the array are acyclic. If the mapped positions in the array are not determined to be acyclic (e.g., cyclic), at least one new hash function is chosen at 18. After choosing at least one new hash function at 18, g positions are again mapped for each $x \in S$ to G, using 2 hash functions at 14. This process (e.g., 16→18→14) is continued until the mapped positions g in the array are determined to be acyclic. If the array size is at least about 2 times the number of elements in S, then the cycle of processes 16→18→14 is expected to take place ≦3 times. In another example, the array size is at least about 2.09 times the number of elements in S. After determining the mapped positions g are acyclic, at 20 variables are generated to store in the g positions, such that a variable stored in position g of $h_1$ of x summed with a variable stored in position g of $h_2$ of x summed with the value of a parity hash function $h_3$ of x (where $h_3$ is a "parity" hash function used to perform a "parity check" to determine whether an queried element is a member of a source set), modulo operated to a value m, which is at least about the size of the range of the output of $h_3$, is equal to the query function of x 20. This formula can be expressed as follows: $f(x) = [g(h_1(x)) + g(h_2(x)) + h_3(x)] \mod m$. After solving the variables using the equation, the values assigned to these variables are placed in the corresponding g positions of the array G at 22. Having populated the G array with the values assigned to these variables, the exemplary method 10 then ends at 24.

Figure 2:
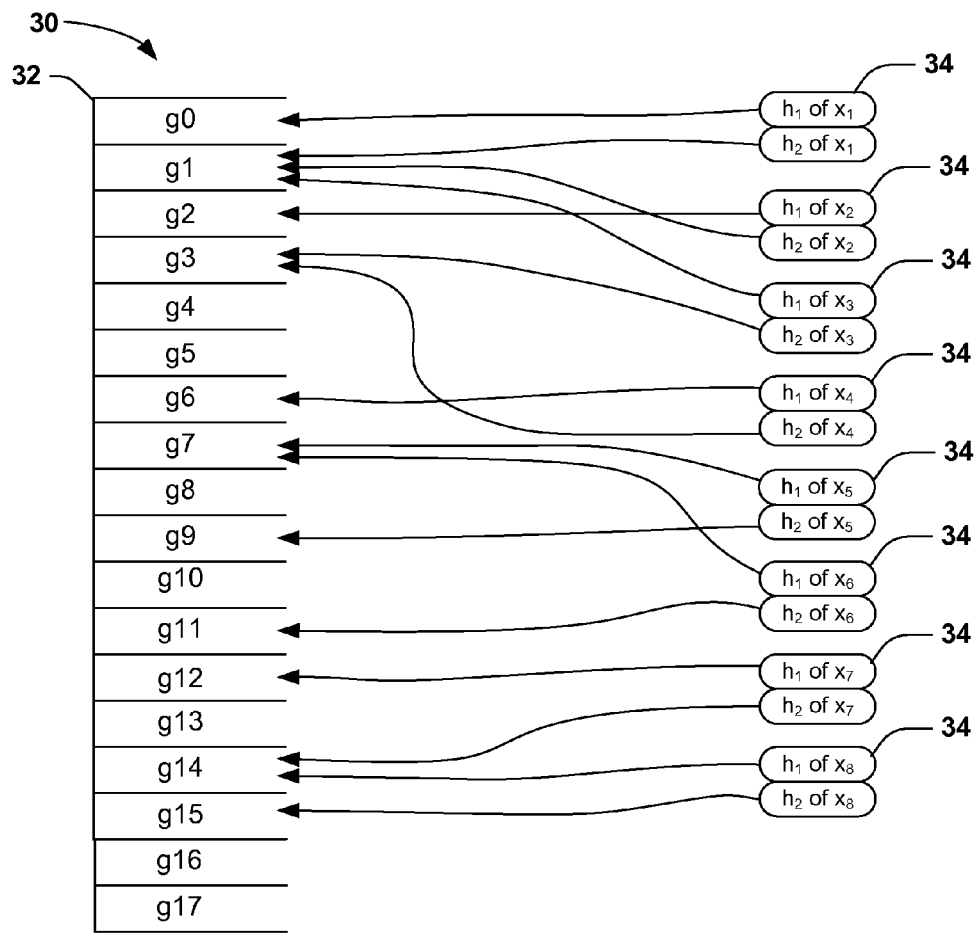
FIG. 2 is an illustration of an exemplary acyclic indexing array map.
Figure 3:
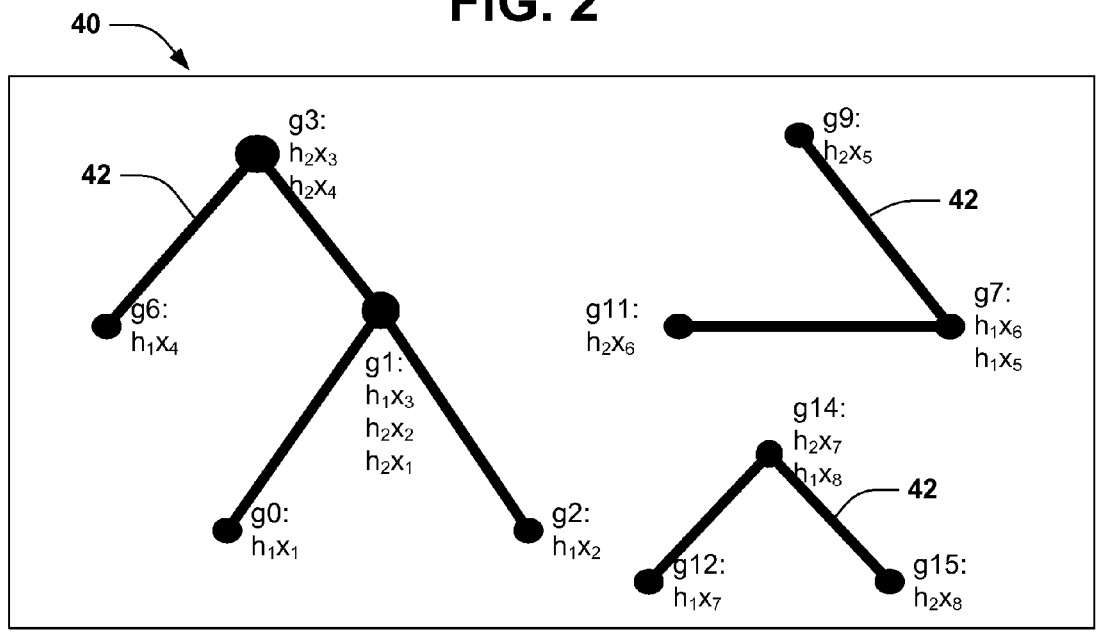
FIG. 3 is a graphical representation of an exemplary acyclic indexing array map.
Figure 4:
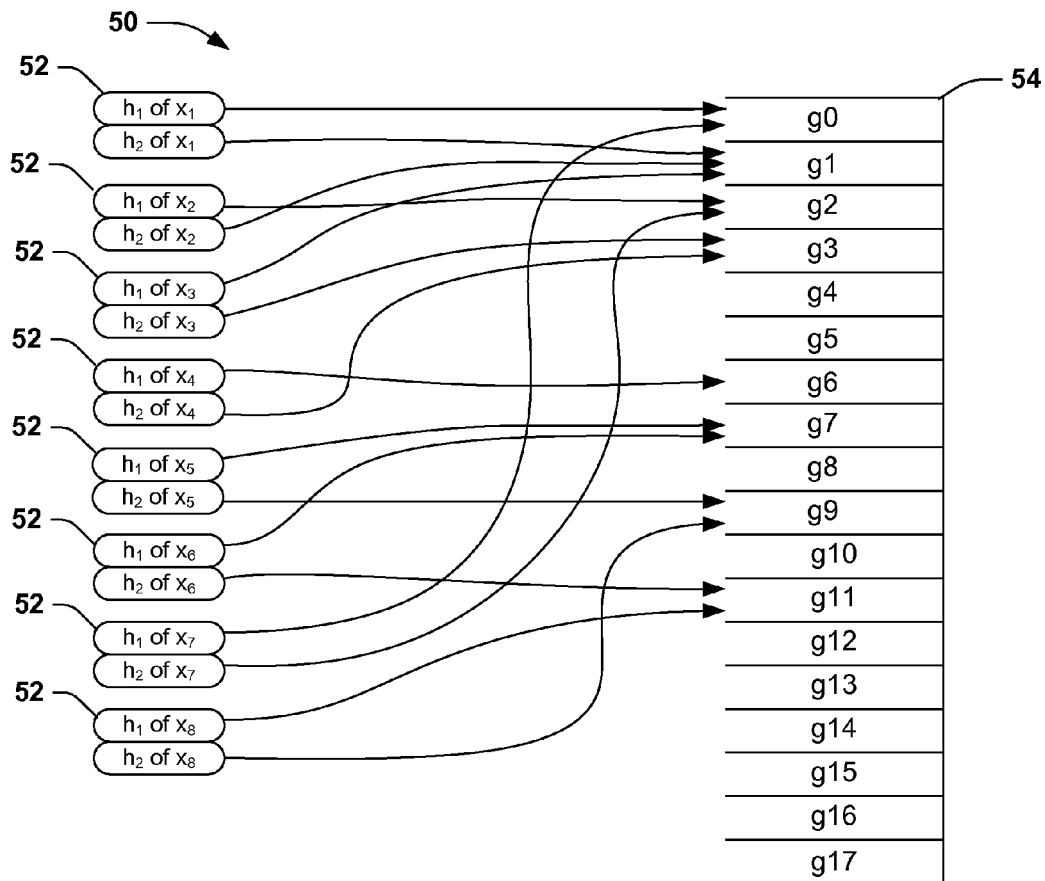
FIG. 4 is an illustration of an exemplary cyclic indexing array map.
Figure 5:
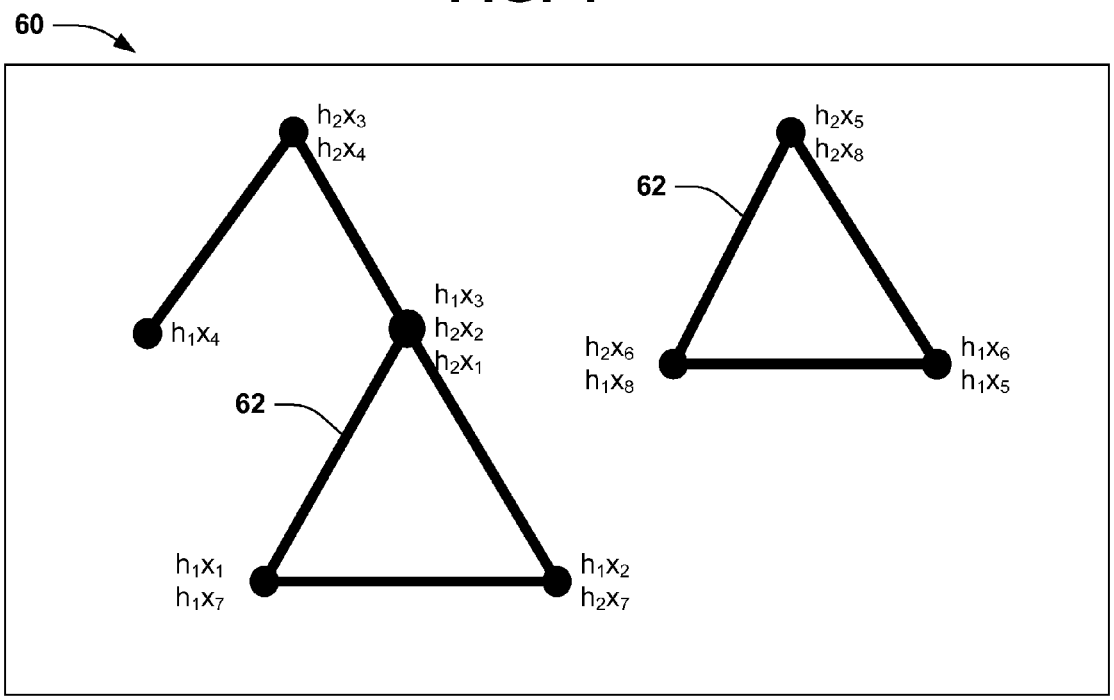
FIG. 5 is a graphical representation of an exemplary cyclic indexing array map.

In one example, in order to populate the indexing array with appropriate variables, the g positions are mapped in an acyclic manner, such that, as illustrated in FIG. 3, in an exemplary graphical representation of the mapping positions g 40, none of the edges of an individual graph tree 42 form a closed loop. In contrast, FIG. 5 illustrates an exemplary graphical representation 60 of a cyclic graph. Here, the edges form a closed loop in the individual graph tree 62. Acyclic mapping is further illustrated in FIG. 2, showing an exemplary method 30 of mapping positions in an indexing array 32. Each set of 2 hash functions 34, for each element of the source set, maps to 2 positions in the indexing array 32. Following the mapping paths from a g position in the indexing array 32 to the hash function 34, then back to g position in the indexing array 32 for the paired hash function 34, then to the connected pair of hash functions 34 for that g position in the indexing array (e.g., connected by sharing a common g position), the path will ultimately end with no more connections for each set of connected hash functions, if the array map is acyclic. In contrast, FIG. 4 illustrates an exemplary method of cyclic mapping positions in an indexing array 54. In the exemplary method 50, following the mapping paths from a g position in the indexing array 54 to the hash function 52, then back to g position in the indexing array 54 for the paired hash function 52, then to the connected pair of hash functions 52 for that g position in the indexing array (e.g., connected by sharing a common g position), the path continues in a loop for each set of connected hash functions, if the array map is cyclic.

In another aspect, during the creation of the data structure, the algorithm for generating the variables, which populate the indexing array, uses the equation $f(x) = [g(h_1(x)) + g(h_2(x)) + h_3$ (x)] mod m to solve for the variables $g(h_1(x))$ and $g(h_2(x))$. The variable $f(x)$ is known before creating the data structure, as shown in the exemplary data structure 70 of FIG. 6. The exemplary data structure 70 illustrates that $f(x)=r$ 88; r is the query result 78, which is known before creating the data structure. The variable $h_3(x)$ is generated by the parity hash function in the process 20 of exemplary method 10 of FIG. 1. Therefore, the remaining variables $g(h_1(x))$ and $g(h_2(x))$ are unknown and can be solved for during process 20 of exemplary method 10 of FIG. 1, for example. FIG. 7 illustrates an exemplary table 90, which displays the two known variables, $h_3(x)$ 96 and the query result $f(x)=r$ 98, for each element of the source set 92. The exemplary table 90 also shows the mapped positions 94 in the indexing array for each element of the source set 92.

Figure 8:
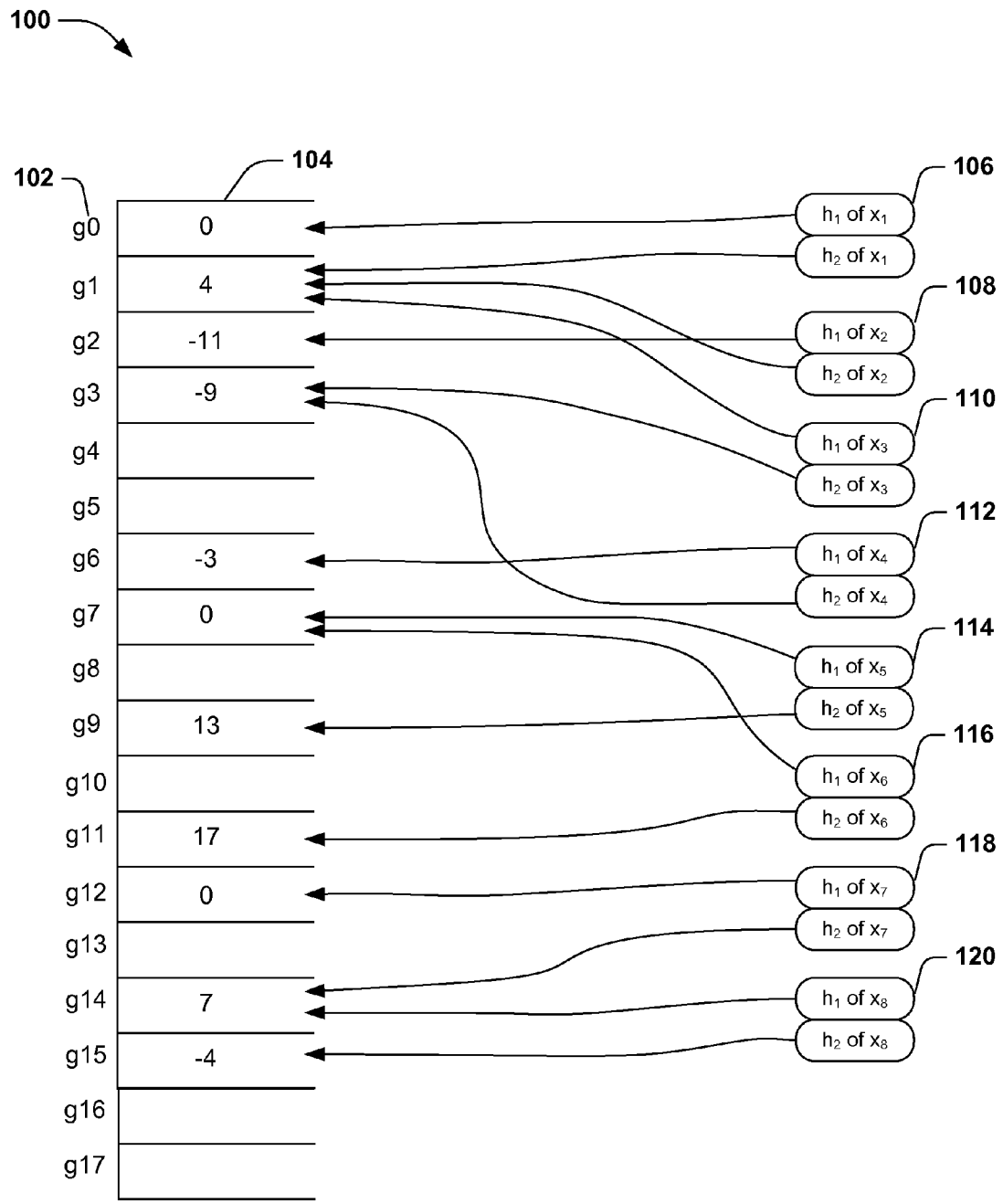
FIG. 8 is an illustration of an exemplary method of storing variables in an indexing array after solving algorithm equations.

FIG. 8 illustrates an exemplary method 100 of solving for the unknown variables, using a mapped indexing array 104. The algorithm for creating the data structure places a 0 in position g0 102 of the indexing array 104, which corresponds to the position to which $h_1$ 106 mapped element $x_1$. The 0 value in this position represents the variable $g(h_1(x_1))$ in the equation $f(x_1)=[g(h_1(x_1))+g(h_2(x_1))+h_3(x_1)]$ mod m. FIG. 7 illustrates an exemplary table 90, comprising exemplary data used to solve the equations for the unknown variables. Column 92 of exemplary table 90 represents the exemplary elements x of the source set S that are mapped to the g positions of the indexing array G. Columns 94 of exemplary table 90 represent the exemplary mapped g positions in the G array for each element x 94. Column 96 of exemplary table 90 represents the exemplary value, generated by a parity hash function $h_3$ for each element x, for the variable $h_3(x)$ 96. Column 98 of exemplary table 90 represents the exemplary value for the variable $f(x)$ for each element x, which is equivalent to a corresponding query result 98 for each element x of the source set S. Therefore, the remaining unknown variable can be solved as follows: $g(h_2(x_1))=[f(x)-g(h_1(x_1))-h_3(x_1)]$ mod m, where m is the range of values generated by $h_3$ (or $|h_3(x)|$). Therefore:

$$g(h_2(x_1))=[12-0-8] \bmod 30=4.$$

In exemplary method 100 of FIG. 8, the value 4 is placed in position g1 102 of the indexing array 104. Exemplary method 100 continues to generate variables, the value of variable $g(h_2(x_2))$ is known to be 4, as the position g1 102 of the indexing array 104 also corresponds to the position to which $h_2$ 108 mapped element $x_2$. Therefore, the unknown variable $g(h_1(x_2))$ can be solved as follows:

$$g(h_1(x_2))=[f(x_2)-g(h_2(x_2))-h_3(x_2)] \bmod m;$$

$$g(h_1(x_2))=[13-4-20] \bmod 30=-11$$

In exemplary method 100, the value −11 is placed in position g2 102 of the indexing array 104. The exemplary method 100 is continued for respective mapped positions 102 in the indexing array 104, for respective sets of positions connected by hash functions (graph trees 42), until all of the variables are generated and populated into the respective positions 102 of the indexing array 104. FIG. 9 illustrates an exemplary table 130 showing the values 134 stored at respective positions 132 of the indexing array, after the variables have been determined by the equations generated by the data structure creation algorithm. Notably, exemplary table 130 displays 0 values 134 corresponding to positions 4, 5, 8, 10, 13, 16, and 17 132. These positions 132 were not mapped by hash functions during the mapping process 14 of exemplary data structure creation method 10 in FIG. 1, and as such, the data structure creation algorithm populates these positions with a 0 value.

In another aspect, once a data structure is created that stores a function (e.g., relationship between a source set and a query result set), in order to be useful, the data structure allows queries to be resolved against it, such that the output of the query informs the reader of the queried item's membership status, along with the result of the function applied to the queried item. In an example of a web-crawler URL manager, if the queried item to the data structure is a URL that has been retrieved by the crawler, the output of the query should inform the reader whether or not the queried URL is a member of the set of URLs previously visited by the web-crawler, and if it is a member, how many URL links were previously found in the queried URL. The web-crawler system can then use this information to help determine whether it needs to visit this URL for the first time (e.g., not a member of the previously visited URLs), or revisit this URL (e.g., based on whether additional links have been added since the last visit to the URL).

Figure 10:
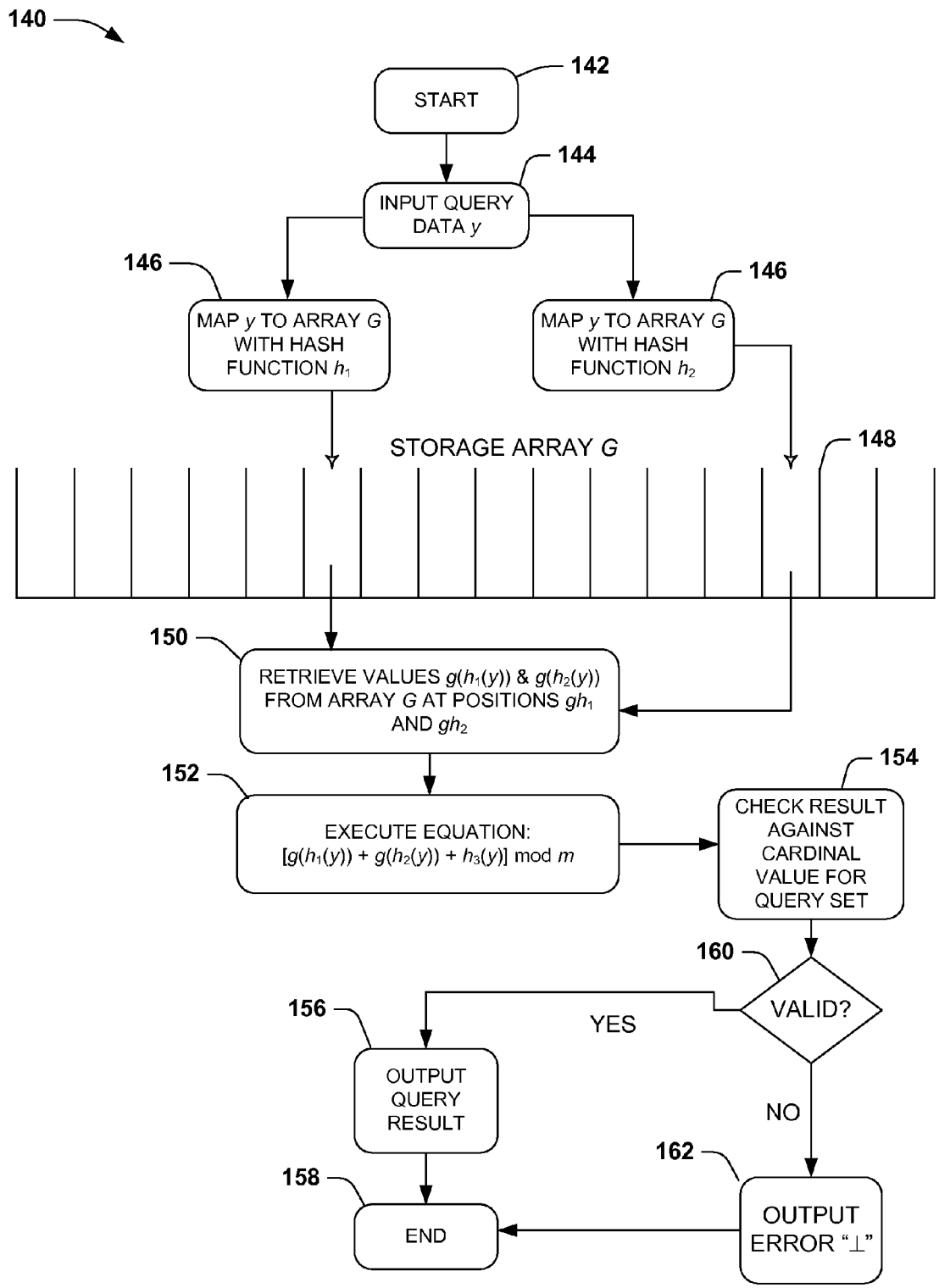
FIG. 10 is a flow diagram illustrating an exemplary method of resolving a query against a source set using a indexing structure.

FIG. 10 illustrates an exemplary method 140 devised to resolve a query against a previously created data structure, determining whether queried data is a member of the source set S and, if it is a member, the result of a function stored in the data structure applied to the queried data. The exemplary method 140 begins at 142 and inputs data that comprises the query, represented as a variable y, at 144. After inputting y at 144, two positions of y are mapped to an indexing array G 148 using hash functions $h_1$ and $h_2$ at 146. Values $g(h_1(y))$ and $g(h_2(y))$ 150, stored at the g positions of the G array 148 that were mapped for y by $h_1$ and $h_2$ at 146, are then retrieved at 150. A result is then produced at 152 by executing an equation: $[g(h_1(y))+g(h_2(y))+h_3(y)]$ mod m, where $h_3(y)$ is a value generated by applying a parity hash function $h_3$ to y, and m is equivalent to a range of values generated by $h_3$. The result is checked against a cardinal set of values corresponding to valid query results at 154. After the result is checked, a query result is output at 156 as either the result generated by the equation at 152, if the result is within the cardinal set of values at 154, or an indicator, represented by the symbol "⊥," which informs the reader the queried data y is not a member of the source set S, if the result is not within the cardinal set of values at 154.

Figure 11:
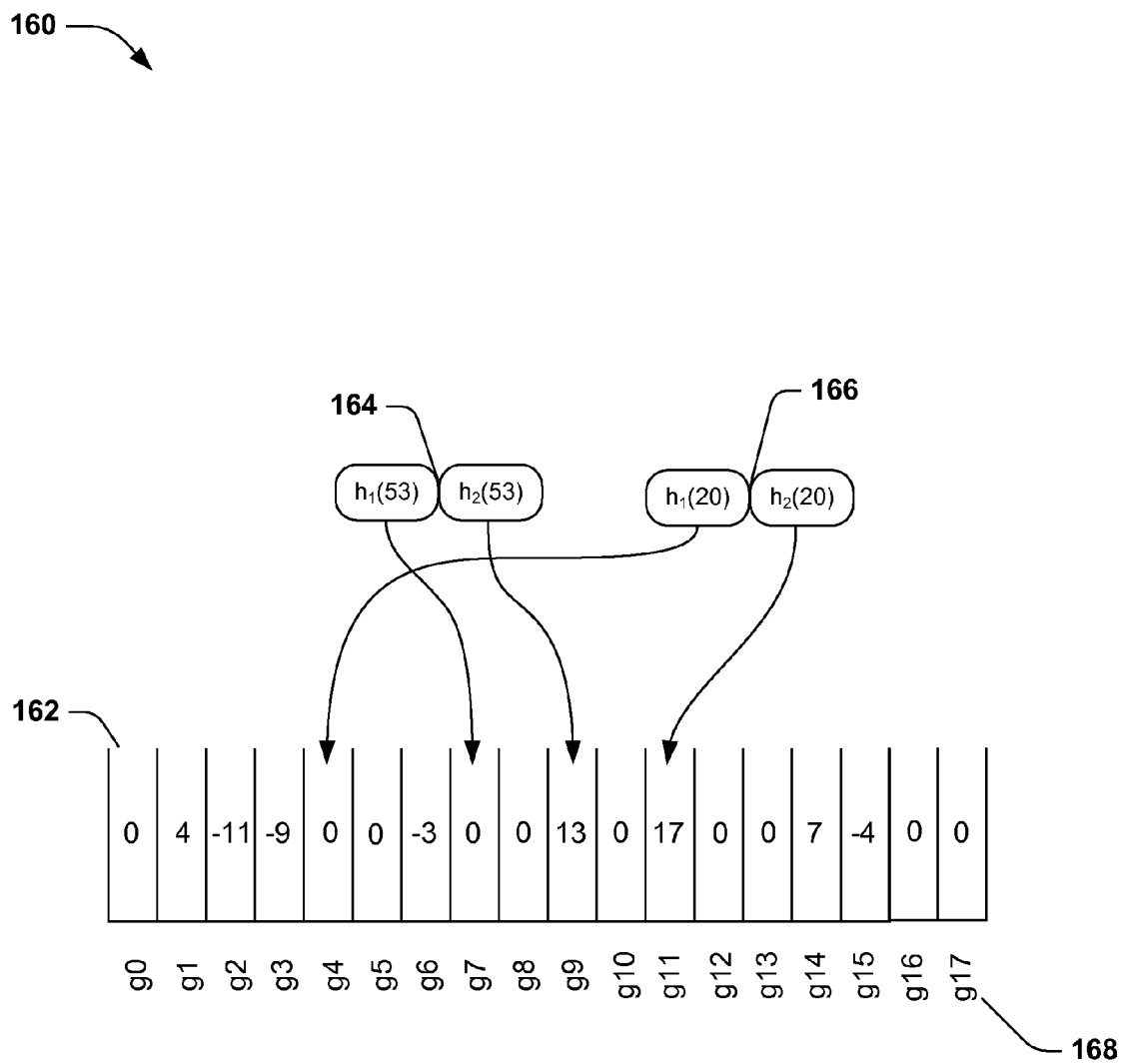
FIG. 11 is a diagram illustrating a portion of an exemplary method for evaluating a query input.

FIG. 11 illustrates a method 160 for processing query inputs (e.g., determining the prime number index value for an inputted value) for a data structure, such as 146 and 150, and array 148 illustrated in FIG. 10, for example. In the exemplary method 160, a query input "53" is processed by the hash functions $h_1$ and $h_2$ 164, which map to g positions 168 g7 and g9 of the indexing array 162. The exemplary method 160 next retrieves the corresponding values $g(h_1(53))=0$ and $g(h_2(53))=13$ stored in positions 168 g7 and g9 of the indexing array 162. The values are used to process the exemplary query equation 152: $[g(h_1(53))+g(h_2(53))+h_3(53)]$ mod m. The exemplary query method 140 retrieves the remaining variables for the equation, $h_3(53)=3$ 96 of exemplary table 90 in FIG. 7, and m=30 as determined by the possible range of results generated by $h_3$. The query function produces the following result: $[0+13+3] \bmod 30=16 \bmod 30=16$. The exemplary query process then checks the value generated by the query equation, "16," against the cardinal set of values for valid query results (e.g., is "16" a member of the query set R 86 of exemplary data structure 80 in FIG. 6). "16" is a member of the cardinal set 86, therefore the exemplary method 140 outputs the result "16," which tells the reader that the inputted value "53" is the $16^{th}$ prime number.

In contrast, in the exemplary method 160, a query input "20" is processed by the hash functions $h_1$ and $h_2$ 166, which map to g positions 168 g4 and g11 of the indexing array 162.

The exemplary method 160 next retrieves the corresponding values $g(h_1(20))=0$ and $g(h_2(20))=17$ stored in positions 168 g4 and g11 of the indexing array 162. The values are used to process the exemplary query equation 152: $[g(h_1(20))+g(h_2(20))+h_3(20)]$ mod m. The exemplary query method 140 retrieves the remaining variables for the equation, $h_3(20)=22$, and m=30. The query function produces the following result: [0+17+22] mod 30=39 mod 30=9. The exemplary query process then checks the value generated by the query equation, "9," against the cardinal set of values for valid query results (e.g., is "9" a member of the query set R 86 of exemplary data structure 80 in FIG. 6). "9" is not a member of the cardinal set 86, therefore the exemplary method 140 outputs "⊥," which tells the reader that the inputted value "20" is not a prime number that we have information about.

In yet another aspect, once a data structure is created that stores a function (e.g., relationship between a source set and a query result set), the data structure may allow the stored function to be updated for one or more of the elements of the source set. For example, if an element of the source set no longer corresponds with the result outputted by the function stored in the data structure, but instead corresponds to a new value, the current function stored for that element can be updated to make the result outputted by the function equivalent to the new value. In an example of a web-crawler URL manager, if the web-crawler retrieves a URL that is determined to be one previously visited by the crawler, but the retrieved URL has more links than previously listed in the data structure, the new number of links can be stored in the data structure. Therefore, the value outputted by the query for this URL will have to reflect the new number of links, instead of what was previously outputted by this URL query. For this to take place, the function stored by the data structure will have to be updated for this particular URL, as an element of the set of URLs previously visited by the web-crawler.

Figure 12:
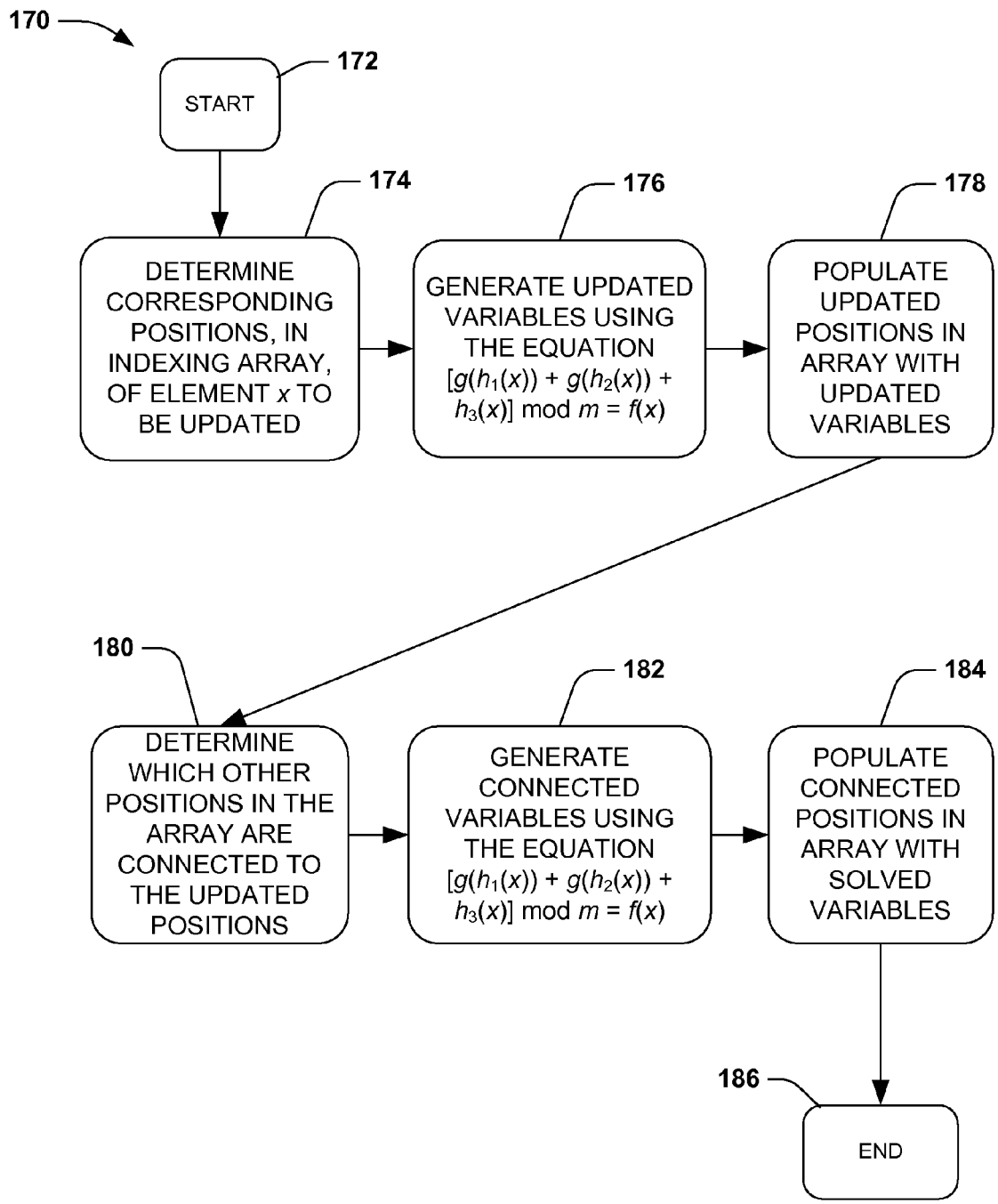
FIG. 12 is flow diagram illustrating an exemplary method of updating a function stored in a indexing structure.

FIG. 12 illustrates an exemplary method 170 devised to update a function stored in a previously created data structure such that a query involving an element of a source set S will produce a valid result corresponding to the updated information. The exemplary method 170 begins at 172 and determines at 174 the g positions of the element x, whose function is being updated, in an indexing array comprising mapped positions, and containing variables, for elements of the source set S. The element x is mapped to corresponding positions g in the indexing array G using hash functions $h_1$ and $h_2$ at 174. Variables are then generated at 176 to update the values stored at the positions g in array G by solving for variables using an equation $f(x)=[g(h_1(x))+g(h_2(x))+h_3(x)]$ mod m; where $f(x)$ is the updated result of the query function for x; $g(h_1(x))$ is the value stored at position g of the array G mapped by hash function $h_1$ for the element x of the source set; $g(h_2(x))$ is the value stored at position g of the array G mapped by hash function $h_2$ for the element x of the source set; $h_3(x)$ is the number generated by the parity hash function for x; and m is the value of the range of values generated by $h_3$. Updated variables are then placed in the corresponding positions g of the array G at 178. Which other positions in the array are connected to the now updated positions is then determined at 180. When the array is represented graphically, as in graph 40 of FIG. 3, for example, those positions connected to the updated position by at least one edge are considered to be connected to the now updated position in the array. New values for the variables located at the connected positions of the array are then generated at 182. Generating new values for the connected variable at 182 comprises, solving for the connected variables using an equation $f(x)=[g(h_1(x))+g(h_2(x))+h_3(x)]$ mod m. The corresponding positions g of the array G are then populated with the updated connected values at 184. Having populating the corresponding positions g of the array G, the exemplary method 170 therefore ends at 186.

Figure 13:
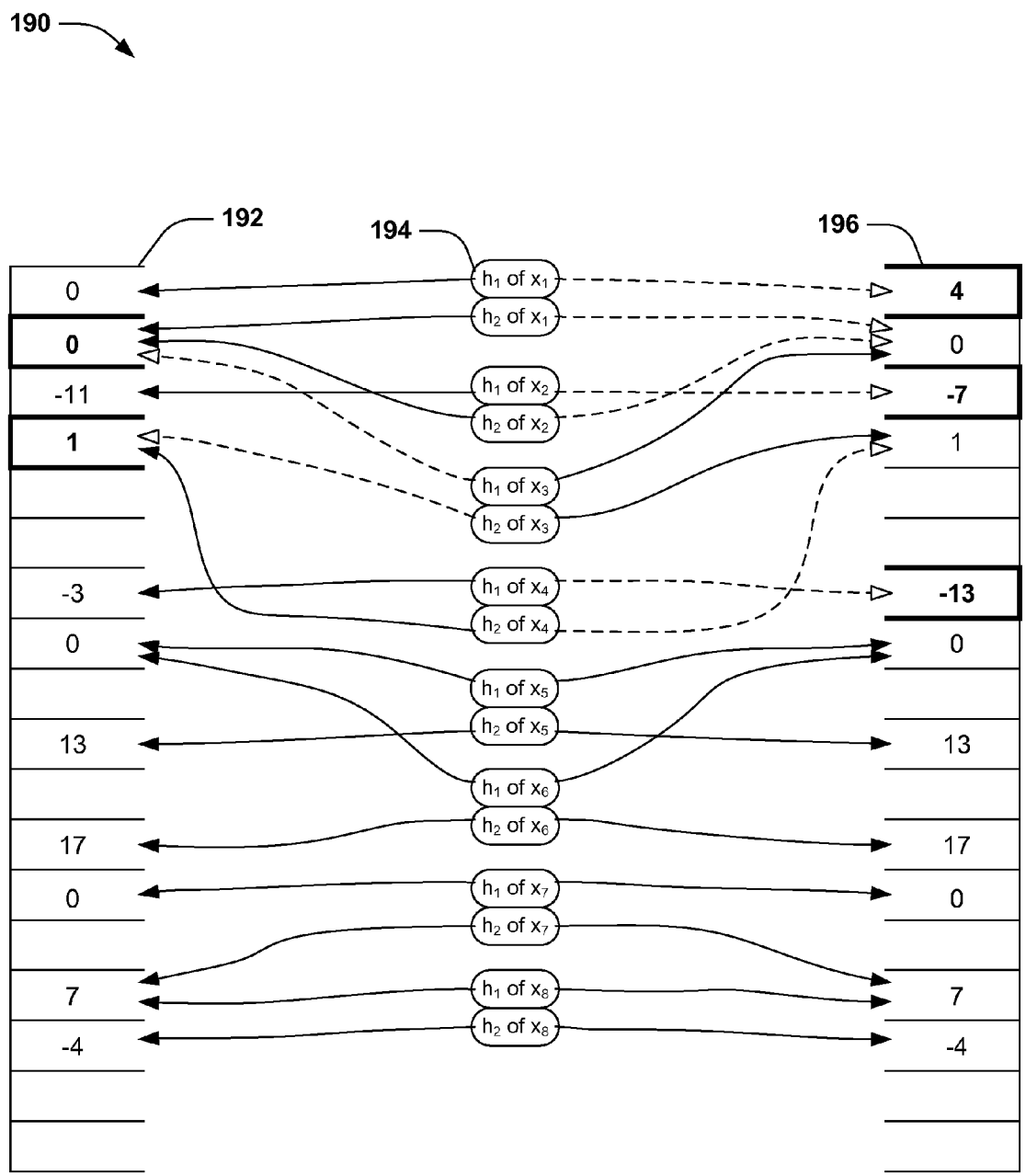
FIG. 13 is an illustration of an exemplary method of storing variables in an index array after changing a functional relationship between S and R.

FIG. 13 is an illustration of an exemplary method 190 for processing updates to a function stored in a previously created data structure, such as described in exemplary method 170 in FIG. 12, for example. In the exemplary method 190, the positions in the indexing array 192, corresponding to element $x_3$, are determined by the hash functions $h_1$ and $h_2$ 194. Updated variables are generated using the exemplary equation in 176 of FIG. 12, and the updated variables (0 and 4) are populated into the positions of the indexing array 192, corresponding to $h_1$ of $x_3$ and $h_2$ of $x_3$. Other elements' ($x_1$, $x_2$, and $x_4$) positions in the indexing array at 196, connected to the updated variables from 192, are determined. Variables are generated using the exemplary equation in 182 of FIG. 12 for $x_1$, $x_2$, and $x_4$ mapped positions 194 in the indexing array, and the generated variables (4, −7, and −13) are populated into the positions of the indexing array 196.

Figure 14:
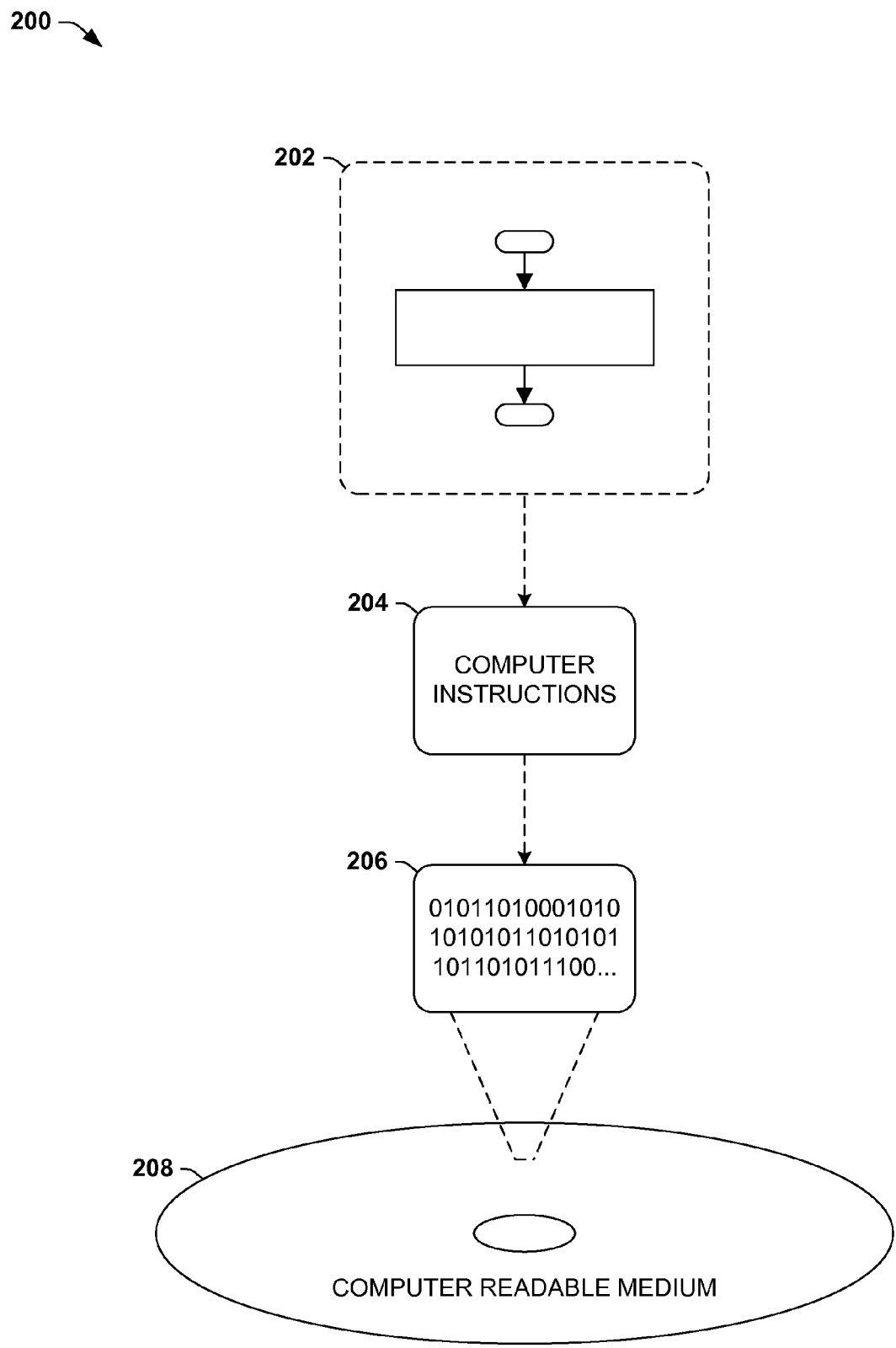
FIG. 14 is an illustration of an exemplary computer-readable medium comprising processor-executable instructions configured to embody one or more of the provisions set forth herein.

Another embodiment (which may include one or more of the variations described above) involves a computer-readable medium comprising processor-executable instructions configured to apply one or more of the techniques presented herein. An exemplary computer-readable medium that may be devised in these ways is illustrated in FIG. 14, wherein the implementation 200 comprises a computer-readable medium 208 (e.g., a CD-R, DVD-R, or a platter of a hard disk drive), on which is encoded computer-readable data 206. This computer-readable data 206 in turn comprises a set of computer instructions 204 configured to operate according to the principles set forth herein. In one such embodiment, the processor-executable instructions 204 may be configured to perform a method 202 of creating a data structure, such as the exemplary method 10 of FIG. 1. In another such embodiment, the processor-executable instructions 204 may be configured to perform a method 202 for resolving a query against a data structure, such as the exemplary system 140 of FIG. 10. In another such embodiment, the processor-executable instructions 204 may be configured to perform a method 202 for updating a function stored in a data structure, such as the exemplary system 170 of FIG. 12, for example. Many such computer-readable media may be devised by those of ordinary skill in the art that are configured to operate in accordance with the techniques presented herein.

Figure 15:
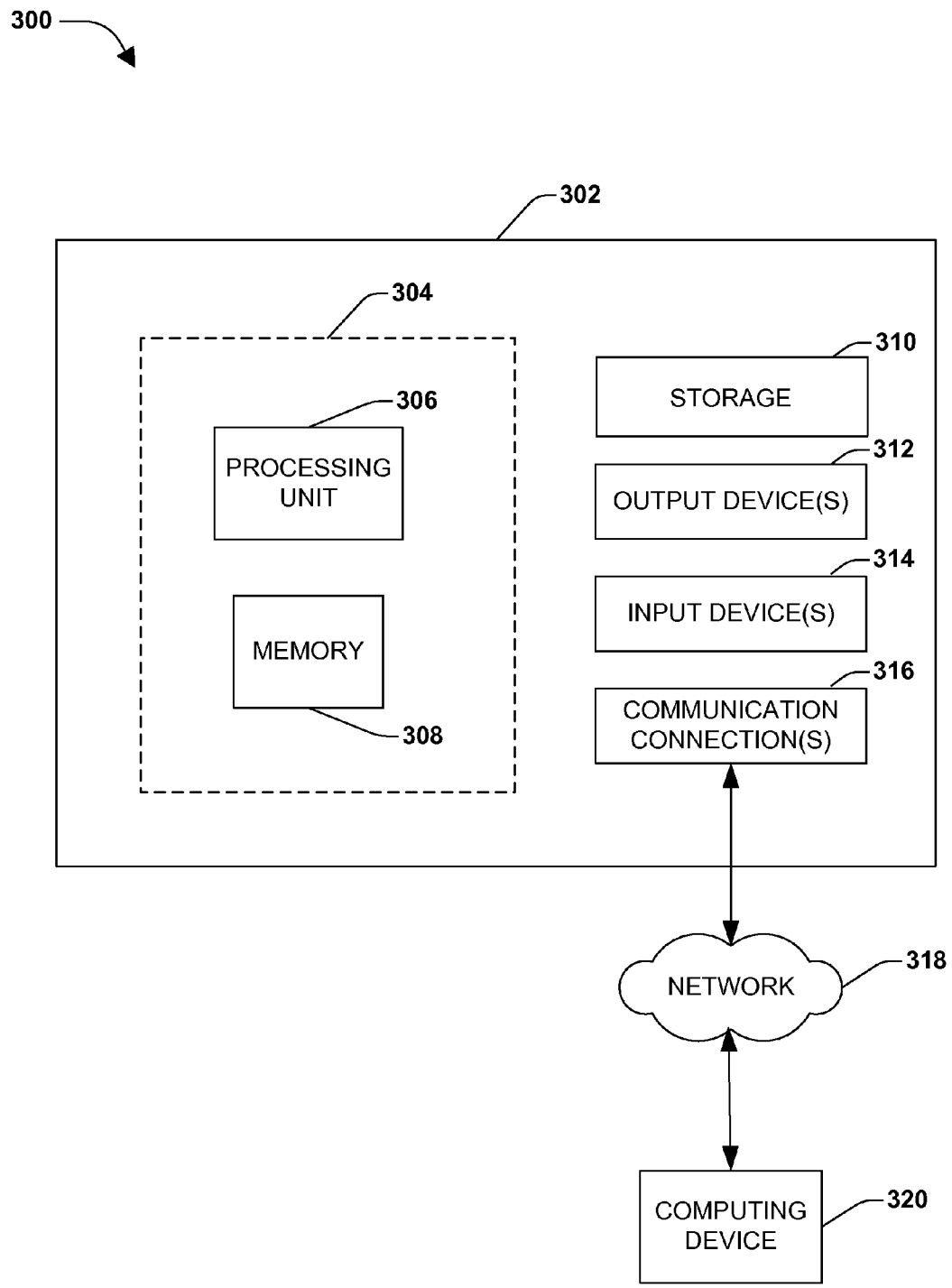
FIG. 15 illustrates an exemplary computing environment wherein one or more of the provisions set forth herein may be implemented.

FIG. 15 and the following discussion provide a brief, general description of a suitable computing environment to implement embodiments of one or more of the provisions set forth herein. The operating environment of FIG. 15 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 15 illustrates an example of a system 300 comprising a computing device 302 configured to implement one or more embodiments provided herein. In one configuration, computing device 302 includes at least one processing unit 306 and memory 308. Depending on the exact configuration and type of computing device, memory 308 may be volatile (such as RAM, for example), non-volatile (such as ROM, flash memory, etc., for example) or some combination of the two. This configuration is illustrated in FIG. 15 by dashed line 304.

In other embodiments, device 302 may include additional features and/or functionality. For example, device 302 may also include additional storage (e.g., removable and/or non-removable) including, but not limited to, magnetic storage, optical storage, and the like. Such additional storage is illustrated in FIG. 15 by storage 310. In one embodiment, computer readable instructions to implement one or more embodiments provided herein may be in storage 310. Storage 310 may also store other computer readable instructions to implement an operating system, an application program, and the like. Computer readable instructions may be loaded in memory 308 for execution by processing unit 306, for example.

The term "computer readable media" as used herein includes computer storage media. Computer storage media includes volatile and nonvolatile, removable and non-removable media implemented in any method or technology for storage of information such as computer readable instructions or other data. Memory 308 and storage 310 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 302. Any such computer storage media may be part of device 302.

Device 302 may also include communication connection(s) 316 that allows device 302 to communicate with other devices. Communication connection(s) 316 may include, but is not limited to, a modem, a Network Interface Card (NIC), an integrated network interface, a radio frequency transmitter/receiver, an infrared port, a USB connection, or other interfaces for connecting computing device 302 to other computing devices. Communication connection(s) 316 may include a wired connection or a wireless connection. Communication connection(s) 316 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 302 may include input device(s) 314 such as keyboard, mouse, pen, voice input device, touch input device, infrared cameras, video input devices, and/or any other input device. Output device(s) 312 such as one or more displays, speakers, printers, and/or any other output device may also be included in device 302. Input device(s) 314 and output device(s) 312 may be connected to device 302 via a wired connection, wireless connection, or any combination thereof. In one embodiment, an input device or an output device from another computing device may be used as input device(s) 314 or output device(s) 312 for computing device 302.

Components of computing device 302 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 302 may be interconnected by a network. For example, memory 308 may be comprised of multiple physical memory units located in different physical locations interconnected by a network.

Those skilled in the art will realize that storage devices utilized to store computer readable instructions may be distributed across a network. For example, a computing device 320 accessible via network 318 may store computer readable instructions to implement one or more embodiments provided herein. Computing device 302 may access computing device 320 and download a part or all of the computer readable instructions for execution. Alternatively, computing device 302 may download pieces of the computer readable instructions, as needed, or some instructions may be executed at computing device 302 and some at computing device 320.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Although the subject matter has been described in language specific to structural features and/or methodological acts, it is to be understood that the subject matter defined in the appended claims is not necessarily limited to the specific features or acts described above. Rather, the specific features and acts described above are merely disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media.

Moreover, the word "exemplary" is used herein to mean serving as an example, instance, or illustration. Any aspect or design described herein as "exemplary" is not necessarily to be construed as preferred or advantageous over other aspects or designs. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for efficiently retrieving data, embodied in instructions in a storage apparatus and executed with a processing apparatus, the method comprising:
   storing a source set array of elements and a query set array of elements, the
   source set array comprising a functional relationship with the query set array;
   choosing at least two hash functions to map respective elements of the source set array to an indexing array such that a map of the indexing array is acyclic;
   calculating at least two hash function arrays for the at least two hash functions based at least in part on the source set array; and
   populating the indexing array based at least in part on at least one of the mapped hash functions, the hash function arrays, a parity hash function, the source set array, the query set array, the functional relationship, or a modulus.

2. The method of claim 1, populating the indexing array comprising solving an equation $f(x)=[g(h_1(x))+g(h_2(x))+h_3(x)] \mod m$, where:
   $f(x)$ represents the functional relationship;
   $h_1(x)$ and $h_2(x)$ represent the hash functions;
   $g(h_1(x))$ and $g(h_2(x))$ represent one or more values of the indexing array based at least in part on the respective hash functions and a position in the indexing array;
   $h_3(x)$ represents the parity hash function;
   mod represents a modulo operation; and
   m represents the modulus.

3. The method of claim 1, the functional relationship supporting an input query which returns at least one of an output indicating the input query belongs to the source set or an output indicating the input query does not belong to the source set.

4. The method of claim 3, the output indicating the input query belongs to the source set comprising an output demonstrating the functional relationship.

5. The method of claim 1, the choosing comprising replacing at least one of the hash functions with a new hash function based at least in part on a condition where the map of the indexing array is cyclical.

6. The method of claim 1, a size of the indexing array greater than twice the size of the source set array.

7. The method of claim 1, a size of at least one of the hash function arrays greater than twice the size of the source array.

8. The method of claim 1, the modulus greater than a size of the parity hash function of the source set array.

9. A method for efficiently retrieving data, embodied in instructions in a storage apparatus and executed with a processing apparatus, the method comprising:
   storing a source set array of elements and a query set array of elements, the
   source set array comprising a functional relationship with the query set array;
   storing at least two hash value arrays for respective source set elements;
   creating a graphical representation based at least in part on at least one of the
   hash value arrays or the source set array; and
   populating an indexing array based at least in part on the graphical representation.

10. The method of claim 9, the graphical representation based at least in part on respective elements in the source set array mapped to two positions in the indexing array.

11. The method of claim 9, the graphical representation based at least in part on respective elements of the hash value arrays representing one or more respective nodes connected based at least in part on a common input.

12. The method of claim 9, the graphical representation is acyclic.

13. The method of claim 9, comprising receiving an input as one of the query elements.

14. The method of claim 9, comprising:
   comparing at least one of the elements of one or more of the arrays to a cardinal set; and
   determining a membership of a set based at least in part on a match between the compared at least one element and the cardinal set.

15. A computer-readable storage device comprising computer-executable instructions, which when executed via a processor on a computer perform acts, comprising:
   storing a source set array of elements and a query set array of elements, the source set array comprising a functional relationship with the query set array;
   choosing at least two hash functions to map respective elements of the source set array to an indexing array such that a map of the indexing array is acyclic;
   calculating at least two hash function arrays for the at least two hash functions, the calculating based at least in part on the source set array; and
   populating the indexing array based at least in part on at least one of the mapped hash functions, the hash function arrays, a parity hash function, the source set array, the query set array, the functional relationship, or a modulus.

16. The computer-readable storage device of claim 15, populating the indexing array comprising solving an equation $f(x)=[g(h_1(x))+g(h_2(x))+h_3(x)] \mod m$, where:

f(x) represents the functional relationship;
$h_1(x)$ and $h_2(x)$ represent the hash functions;
$g(h_1(x))$ and $g(h_2(x))$ represent one or more values of the indexing array based at least in part on the respective hash functions and a position in the indexing array;
$h_3(x)$ represents the parity hash function;
mod represents a modulo operation; and
m represents the modulus.

17. The computer-readable storage device of claim 15, the functional relationship supporting an input query which returns at least one of an output indicating the input query belongs to the source set or an output indicating the input query does not belong to the source set.

18. The computer-readable storage device of claim 15, the choosing comprising replacing at least one of the hash functions with a new hash function based at least in part on a condition where the map of the indexing array is cyclical.

19. The computer-readable storage device of claim 15, a size of at least one of the hash function arrays greater than twice the size of the source array.

20. The computer-readable storage device of claim 15, the modulus greater than a size of the parity hash function of the source set array.

* * * * *